Figure 1:
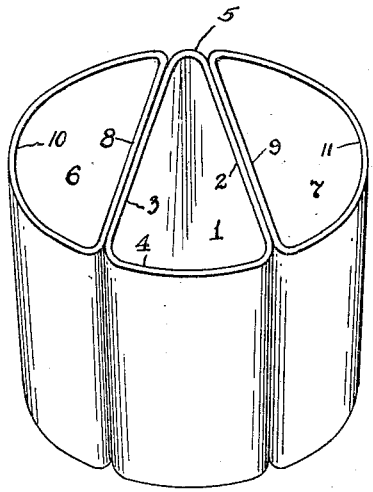

June 14, 1932.　　F. I. PIERCE　　1,863,413

COOKING UTENSIL

Filed July 31, 1930

INVENTOR.
Fred I. Pierce
BY
Fay, Oberlin & Fay
ATTORNEYS.

Patented June 14, 1932

1,863,413

UNITED STATES PATENT OFFICE

FRED I. PIERCE, OF NIAGARA FALLS, NEW YORK

COOKING UTENSIL

Application filed July 31, 1930. Serial No. 471,998.

This invention, relating as indicated, to cooking utensils, has specific reference to cooking utensils employing a plurality of individual units adapted to be brought into juxtaposition over a suitable source of heat, such as a gas burner, so that a plurality of separate utensils may be employed over one such burner. The manner in which such multiple unit cooking utensils have been made heretofore has been to have the cross section of each of the individual utensils in the form of a sector of a circle, the relative size of the arc in each case depending upon the number of separate utensils employed to make up a substantially cylindrical utensil adapted to be positioned on the burner.

One of the chief disadvantages of any of the above forms of construction is that when any single unit of the group is omitted a corresponding sector of the burner or hot plate is left uncovered, resulting in a loss of heat and an uneven distribution of the heat supplied to those elements which are employed. This condition is true whether the individual elements are semi-cylindrical or whether they are, as above indicated, made in the form of sectors adapted to be assembled into a cylindrical group.

It is among the objects of my invention to provide a multiple unit cooking utensil which shall have none of the above undesirable characteristics. Specifically, my invention contemplates the provision of a plurality of separate utensils which may be brought into juxtaposition over a burner or hot plate to form a substantially cylindrical body and which may be utilized when one of such elements is omitted to entirely cover the heat area covered when all of the elements are employed. By forming the separate elements of the combination so that the side elements have a cross section equal to the segment of a circle, the arc of which does not exceed a semicircle, and by providing a central element having a cross section equal to the portion of a circle included between two chords, whether such chords be parallel or non-parallel, either two or three of such units may be employed in combination without leaving exposed any of the heat radiating surface of the element on which the utensils are placed.

Other objects of my invention will appear as the description proceeds.

To the accomplishment of the foregoing and related ends, said invention, then, consists of the means hereinafter fully described and particularly pointed out in the claims, the annexed drawing and the following description setting forth in detail certain mechanism embodying the invention, such disclosed means constituting, however, but one of various mechanical forms in which the principle of the invention may be used.

Figure 2:
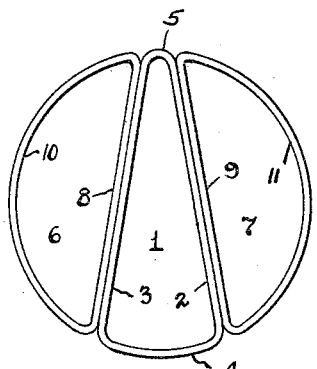

In said annexed drawing:

Fig. 1 is a perspective view of the utensils comprising my invention shown in assembled relation; Fig. 2 is a plan view of the utensils illustrated in Fig. 1; and Fig. 3 shows the two outer elements brought into abutting relation, with the central element as illustrated in Fig. 2 omitted.

Referring more specifically to the drawing and more especially to Figs. 1 and 2, the central unit 1 of the utensil consists of side walls 2 and 3, which are in effect chords of the circle, the circumference of which forms the sides 4 and 5. The side elements 6 and 7 have their cross sections in the form of segments of a circle, the chords thereof corresponding to the inner walls 8 and 9, respectively, and the outer walls 10 and 11 formed by the circumference of such circle. It will be understood that bottoms will be provided for such utensils in the usual manner. If desired, lids may also be provided for the several elements which correspond to the cross section of such elements, which lids may be adapted to be positioned on the tops of the several units so as not to interfere with the bringing together of the units in the manner illustrated in Fig. 2.

Figure 3:
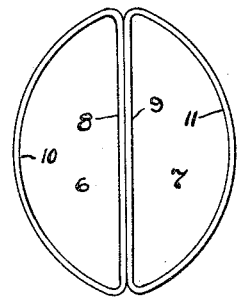

By forming utensils in the above described manner, it will be apparent that by omitting the center member 1, the side elements 6 and 7 may be brought into juxtaposition, as most clearly illustrated in Fig. 3, and when in such position a circle will be closely approximated, depending upon the arcuate extent of the lateral walls of such elements. By bringing the side elements 6 and 7 into position as illustrated in Fig. 3, the burner area on which such elements are usually placed may be entirely covered without exposing any surface thereof, which would result in a waste of heat or uneven distribution of heat as transferred to the individual utensils of the set.

In the light of the above it is believed that a further description of the principles of my invention will not be necessary for those familiar with the art and, further, that numerous advantages result from the employment of utensils constructed in accordance with the principles of my invention, which advantages are so well known as not to require repetition. In order to facilitate cleaning of the several units, it may be desirable to form all of the corners of such units on large arcs especially the corner at 5 of element 1. The manner in which this may be accomplished is believed to be obvious, so that the same is not specifically illustrated in the drawing.

Other modes of applying the principle of my invention may be employed instead of the one explained, change being made as regards the mechanism herein disclosed, provided the means stated by any of the following claims or the equivalent of such stated means be employed.

I therefore particularly point out and distinctly claim as my invention:—

1. In a multiple unit cooking utensil, the combination of three separate units adapted to substantially form a cylinder when in juxtaposition, two of said units having cross sections in the form of segments of a circle.

2. In a multiple unit cooking utensil, the combination of at least three separate utensils adapted to substantially form a cylinder when in juxtaposition, two of said units having cross sections in the form of segments of a circle, the chords of such segments being in non-parallel relation when all of said units are in juxtaposition.

3. In a multiple unit cooking utensil, the combination of a plurality of units adapted to substantially form a cylinder when in juxtaposition, one of such units having a cross section in the form of a portion of a circle lying between two chords.

4. In a multiple unit cooking utensil, the combination of a plurality of units adapted to substantially form a cylinder when in juxtaposition, one of such units having a cross section in the form of a portion of a circle lying between two non-parallel chords.

5. In a multiple unit cooking utensil, the combination of a central unit having a cross section in the form of a portion of a circle lying between two chords, and side units adapted to be placed in juxtaposition with said central unit, said side units having flat faces adapted to coincide with the flat faces of said central unit.

6. In a multiple unit cooking utensil, the combination of a central unit having a cross section in the form of a portion of a circle lying between two non-parallel chords, and side units adapted to be placed in juxtaposition with said central unit, said side units having flat faces adapted to coincide with the flat faces of said central unit.

7. A single unit of a multiple unit cooking utensil having a cross section in the form of a portion of a circle lying between two chords of such circle.

8. A single unit of a multiple unit cooking utensil having a cross section in the form of a portion of a circle lying between two non-parallel chords of such circle.

Signed by me this 25 day of July, 1930.

FRED I. PIERCE.